United States Patent [19]

Turner

[11] Patent Number: 5,852,355
[45] Date of Patent: Dec. 22, 1998

[54] OUTPUT SMOOTHING IN A SWITCHED RELUCTANCE MACHINE

[75] Inventor: Michael James Turner, Leeds, England

[73] Assignee: Switched Reluctance Drives Limited, Harrogate, England

[21] Appl. No.: 862,671

[22] Filed: May 23, 1997

[30] Foreign Application Priority Data

May 23, 1996 [GB] United Kingdom ............... 9610846

[51] Int. Cl.$^6$ ...................................................... H02P 5/05
[52] U.S. Cl. ........................ 318/701; 318/254; 318/432; 318/702
[58] Field of Search ................................. 318/254, 432, 318/448, 685, 696, 700, 701, 702, 720, 721, 722, 724

[56] References Cited

U.S. PATENT DOCUMENTS

| | | |
|---|---|---|
| 4,645,991 | 2/1987 | Ban et al. . |
| 4,670,696 | 6/1987 | Byrne et al. . |
| 4,707,650 | 11/1987 | Bose ........................................ 318/685 |
| 4,961,038 | 10/1990 | MacMinn ............................. 318/701 X |

FOREIGN PATENT DOCUMENTS

| | | |
|---|---|---|
| 0 217 599 A2 | 4/1987 | European Pat. Off. . |
| 0 181 511 | 8/1990 | European Pat. Off. . |
| 0 573 198 A1 | 12/1993 | European Pat. Off. . |
| 0 616 418 A1 | 9/1994 | European Pat. Off. . |
| 1 597 486 | 9/1981 | United Kingdom . |
| 2 071 939 | 9/1981 | United Kingdom . |
| 2 188 801 | 10/1987 | United Kingdom . |
| 2 293 705 | 4/1996 | United Kingdom . |
| 2 305 313 | 4/1997 | United Kingdom . |

OTHER PUBLICATIONS

"Torque Ripple Minimization in Switched Reluctance Motor Drives by PWM Current Control", by Husian and Ehsani, IEEE Transactions on Power Electronics, vol. 11, No. 1, Jan. 1996.

"Computer–optimised current waveforms for switched–reluctance motors", by Lovatt and Stephenson, IEE Proc.–Electr. Power Appl., vol. 141, Mar. 1994, pp. 45–51.

"The Characteristics, Design and Applications of Switched Reluctance Motors and Drivers", by Stephenson and Blake, presented at the PCIM '93 Conference and Exhibition at Nurnberg, Germany, Jun. 21–24, 1993.

"The Design and Performance of a Multiphase Switched Reluctance Drive", by Pollock and Williams, EPE Aachen, 1989, pp. 29–34.

"Feedback Linearizing Control of Switched Reluctance Motors", by Ilic'–Spong, Marino, Peresada and Taylor, IEEE Transactions on Automatic Control, vol. AC–32, No. 5, May 1987, pp. 371–379.

"Three–Phase Switched Reluctance Motor Design to Reduce Torque Ripple", by Wallace and Taylor, Georgia Institute of Technology, School of Electrical Engineering, Atlanta, Georgia, pp. 783–787.

"Digital Control of Dynamic Systems", by Franklin, Powell and Workman, Addison–Wesley Publishing Company, Second Edition, pp. 581–592.

*Primary Examiner*—Bentsu Ro
*Attorney, Agent, or Firm*—Patterson & Keough, P.A.

[57] ABSTRACT

A switched reluctance machine run as a servo-motor has its torque ripple reduced by shaping the chopping current by which the rotor is rotated relative to the stator. The shaping includes reducing the rate of change of torque with respect to time such that the magnitude of the torque ripple is reduced and therefore more easily rejected by the control function of the machine controller.

26 Claims, 6 Drawing Sheets

OUTPUT SMOOTHING IN A SWITCHED RELUCTANCE MACHINE

BACKGROUND OF THE INVENTION

1. Field of the Invention

This invention relates to a method and apparatus for smoothing the output of a switched reluctance machine.

2. Description of Related Art

The switched reluctance (SR) machine can be operated as a motor or a generator. In either mode, it offers the advantages of simple construction, low assembly costs, high specific output, fast dynamic response and high efficiency compared with many conventional electric machines. As a motor, the desired output is torque from an electrical input. As a generator, the desired output is electrical power from a mechanical input.

The machine comprises a rotor, defining rotor poles, and a stator, defining stator poles and carrying one or more phase windings. The winding is energized to establish magnetic polarities in one or more pairs of poles such that magnetic flux flows from one stator pole through the rotor to another stator pole and returns through the stator core. Energization of the phase winding is timed according to the angular position of the rotor. In a multi-phase machine, the phase windings are energized in sequence as the rotor rotates. Switched reluctance machines are described in the paper 'The Characteristics, Design and Applications of Switched Reluctance Motors and Drives' by J. M. Stephenson et al, PCIM '93 Conf. Nurnberg, Germany, June 1993.

The ability to change magnetic flux (and therefore torque) rapidly, combined with low rotor inertia, gives the SR machine inherent advantages in respect of its dynamic response. Indeed, drives not designed with dynamics in mind have been shown to offer servo-like speeds of response, while achieving other desirable goals such as high specific output and high efficiency.

When operated with a conventional control strategy, the SR motor operates with a magnetic flux level approximately proportional to its load torque. This gives it potential thermal advantages for servomotor applications. Unlike (for example) an induction motor operated with field-oriented control ("vector control") which, to achieve high dynamic response, must be at least partially fluxed at all times, the losses in the SR motor are largely in proportion to its load torque. Thus, in servomotor applications, current is supplied only in proportion to the forces required to move the rotor from its controlled desired position.

As with all electric motors, SR motors exhibit output torque ripple, i.e. the torque output is not constant with respect to rotor angle. This contributes to degraded speed and/or position accuracy. The SR motor is similar to other types of brushless motor in this regard. SR motors with low phase numbers (e.g. less than three phases) generally have large torque ripple. As such, they are confined to applications in which torque ripple can be tolerated. According to conventional thinking, the SR servomotor requires a large number of phases to reduce the torque ripple. For example, defining ripple as (peak-mean)/mean, a typical torque ripple of 25 to 35% for a three-phase SR motor can be reduced to 20 to 25% for a four-phase unit. Pollock and Williams (Proc. of European Power Electronics Conference, Aachen, October 1989, pp 29 to 34) recommend the use of 5-phase or 7-phase systems.

The problem of torque ripple is of particular concern in an SR servomotor. The problem is particularly pronounced at low speeds where the speed and inertia of the rotor are insufficient to effect torque smoothing through the so-called 'flywheel' action as the rotor passes from the influence of one phase winding to that of the next in the phase sequence.

Apart from increasing the number of poles and/or phases to address the problem of torque ripple, there have been other attempts which concentrate on the motor geometry. For example, Wallace and Taylor (Proc International Conference on Electrical Machines (ICEM 90) Conference, Cambridge, Mass., USA, August 1990, pp 788–793) have studied the effect of pole arcs on torque ripple.

Other attempts to reduce torque ripple have been made through methods of electronic control. One proposal was feed-forward linearization as discussed in the paper by Lovatt and Stephenson, Institution of Electrical Engineers (IEE) Proceedings on Electrical Power Applications, Vol 141, No. 2, March 94, pp 45–51. In general, feed-forward linearization involves modulating the phase excitation of the motor with respect to rotor angle and using a predetermined profile which may be a function of required torque, speed and/or other system variables. This approach has been shown to be effective in the laboratory, but requires considerable electronic hardware for generation and/or storage of the profile, and individual modulation of the motor phases. Typically, it also requires an accurate, high-resolution encoder for efficient operation. This technique is prone to difficulties of implementation where a generic profile is used for a number of ostensibly identical motors. In practice, the motors have small variations in their electromagnetic characteristics, leading to control errors. Thus, its practical and commercial usefulness is not yet established.

Another proposed technique is feedback linearization as described in the paper "Feedback linearizing control of switched reluctance motors" by Ilic-Spong et al, IEEE Transactions on Automatic Control, Vol AC-32, No 5, May 87, pp 371–379. This technique uses state estimation techniques to observe, and hence control, desired motor parameters (e.g. torque) from known (measured) variables such as speed, rotor position or phase current. Computational demands are heavy, however, and look-up tables and significant storage or interpolating hardware may be required to implement approximations to some of the required non-linear functions. The method has not yet seen commercial implementation.

All of the prior art methods of reducing torque ripple through electronic control use either storage of a current or flux profile or of parameters from which such a profile can be generated. Such storage is expensive and complex and the values are specific to a particular machine. Other prior art methods require less parametric storage but require relatively intensive computation. By contrast, this invention requires neither such large storage nor large computational power.

It will be apparent to the skilled person that, up to now, modification of the physical structure of the motor has proved to be the most practicable area of torque ripple improvement, even though the gains are relatively limited and the improvement is at the cost of more intricate and specialized rotor shapes.

The skilled person will appreciate that torque ripple arises from varying levels of torque output for a given excitation at different parts of the rotor cycle. In the same way, an SR generator can also be subject to varying levels of electrical output for a given amount of rotor movement at different parts of the rotor cycle.

SUMMARY OF THE INVENTION

It is an object of the present invention to provide a switched reluctance machine system with improved output ripple characteristics which uses a conventional machine construction and yet does not place excessive demands on the control strategy for computation or storage capacity.

According to one embodiment of the present invention there is provided a method of smoothing the output ripple of a switched reluctance machine comprising a rotor, a stator, and at least one phase winding, the method comprising: rotating the rotor relative to the stator; monitoring a position parameter of the rotor relative to the stator; profiling the phase winding current by shaping the leading and trailing edges so as to reduce the rate of change of torque with respect to time; and controlling the profiled phase current with feedback based on the monitored position parameter so as to reduce the overall magnitude of the output ripple of the machine.

According to this embodiment, the present invention uses shaping of the profile of the amount of energization of a phase winding to reduce the rate of change of output with respect to rotor angle and, therefore, with respect to time for a given speed, and performs feedback control on the profiled current, as opposed to addressing the magnitude of the inherent output ripple itself. The invention takes a radically different approach to conventional wisdom and can advantageously exploit a coarse pole structure. By doing so, and in conjunction with the shaping of the rise and fall of the winding current, a more relaxed control environment exists in which the demanding requirement for a control strategy of wide bandwidth is reduced. This leads to reduced control equipment costs. The invention also enables real-time processing of the control requirements with reduced storage and computing requirements.

The rate of change of current may be controlled according to this embodiment of the invention to reduce the rate of change with respect to time which gives rise to output ripple either as torque in a motor or electrical power in a generator. Preferably, the current is controlled to provide a substantially smoother transition between a desired upper value in a phase conduction and a lower value otherwise. Desirable points at which to initiate and withdraw current are during periods of constant inductance.

Preferably, the profiling includes using feed forward in which the monitored position parameter is compared with a reference signal to produce an error signal, including output ripple information.

BRIEF DESCRIPTION OF THE DRAWINGS

The present invention can be put into practice in various ways, some of which will now be described by way of example with reference to the accompanying drawings in which.

DETAILED DESCRIPTION OF PREFERRED EMBODIMENTS

Figure 1:
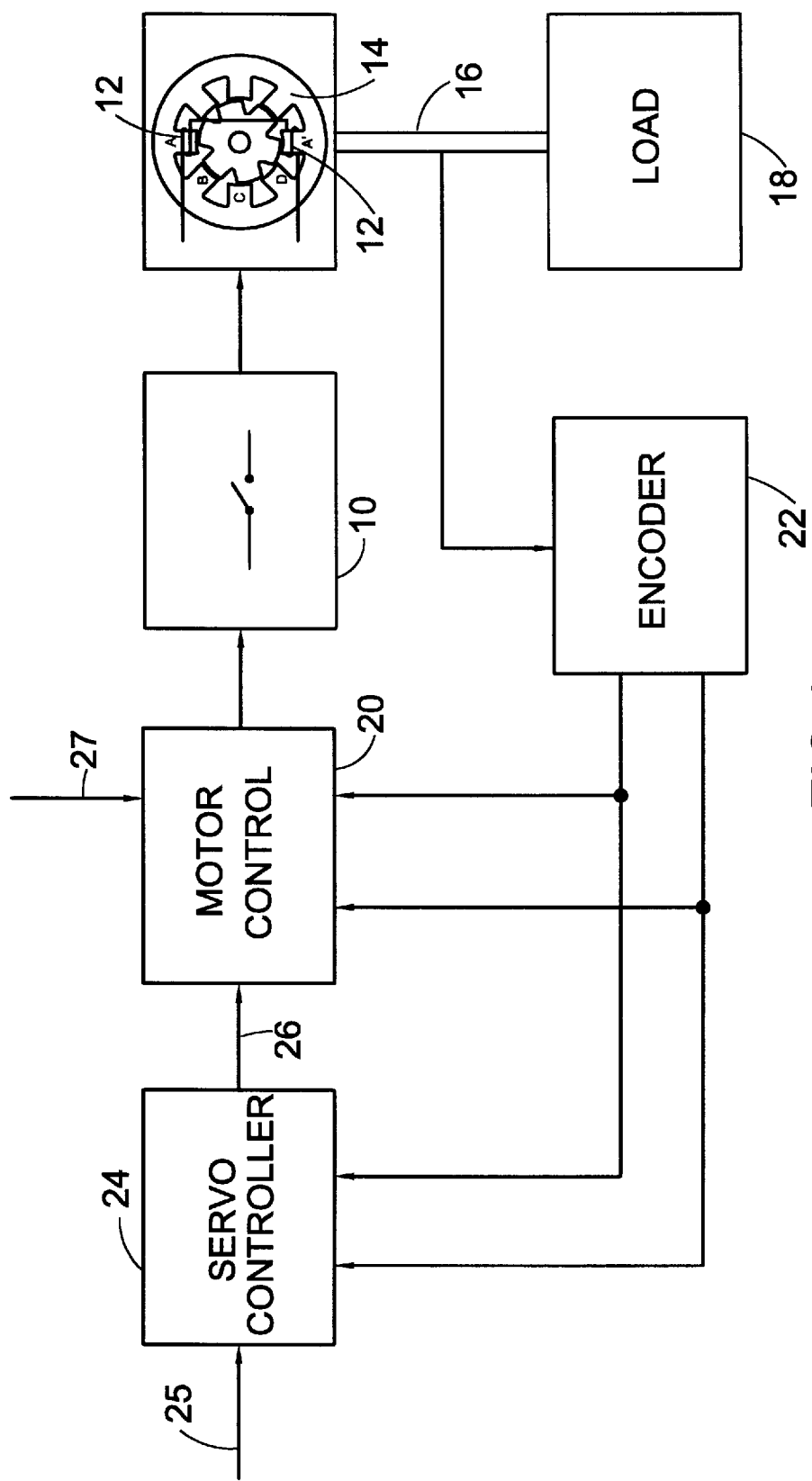
FIG. 1 is a schematic block diagram of a switched reluctance servo-system according to the invention.

Referring to FIG. 1 of the drawings, a switched reluctance servo-system comprises a conventional power electronic switching circuit 10 which is actuatable to control the energization of phase windings 12 (only one of which is shown for the sake of clarity) of a four-phase, eight stator pole, six rotor pole switched reluctance motor 14. The rotor of the motor 14 is drivingly connected with an output shaft 16 which is, in turn, connected to drive a mechanical load 18.

The motor 14 is controlled by a controller 20 which is arranged to govern the actuation of the switching circuit 10 so that the phase windings 12 are energized in sequence as the rotor rotates in one direction or the other, or to reverse the sequence if the rotor rotation is to be reversed. The information on the position of the rotor is derived from an encoder 22.

The servo-system may be arranged to follow a position and/or a speed input. In the case of either, the encoder used in this embodiment is a conventional shaft-mounted resolver made by Litton Industries, Inc. of Clifton Heights, Pa., USA together with a 2S82 resolver-to-digital converter made by Analog Devices Inc. of Norwood, Mass., USA. This is used as a switched reluctance motor rotor position transducer mounted, for example, on the rotor shaft 16. Alternatively, the invention could use a sensorless rotor position determining technique as described, for example, in EP-A-0573198, which is incorporated herein by reference. Of course, in either case, the position information could equally well be derived from the mechanical load itself, as will be apparent to those of ordinary skill in the servo-control systems art. The arrangement of FIG. 1 is a schematic arrangement for generally illustrative purposes only.

The feedback information is a rotor position parameter. Rotor velocity, acceleration or some other such parameter could equally well be used to derive the rotor feedback information desired.

The encoder 22 is coupled to the output shaft of the machine and supplies signals representing both speed and position to the machine controller 20 and to a servo controller 24. A reference signal 25, representing the desired shaft speed or position, is applied to the servo controller which produces a torque demand signal 26 as a function of the error between the reference and actual values. In this embodiment both the servo controller 24 and the switched reluctance motor controller 20 are implemented in a Motorola 68332 microcontroller combined with a Xilinx field programmable gate array. The Xilinx device provides high-speed digital control functions which cannot satisfactorily be fulfilled by the microcontroller. For example, those functions required for control of the SR motor phase currents are derived from the array. It is also used to implement basic logical functions as a cost and space-effective alternative to discrete components and/or dedicated logic integrated circuits. The control law function will be described in more detail below.

The output of the servo-controller 24 is the demand 26, which is supplied to the motor controller 20.

In this embodiment of the invention, the speed or position control (or both) of the SR motor is regulated by the servo feedback control loop in FIG. 1. The control law function in this embodiment is a proportional-plus-integral function. An alternative would be a proportional-integral-derivative function or more complex methods based on more recent control theory, such as the PTOS (proximate time-optimal servo)

described by Franklin et al in "Digital Control of Dynamic Systems", Addison Wesley, 1990. These are well known to the skilled person.

Correct design of a conventional feedback loop will reject large disturbances in the controlled system provided that the disturbance frequencies lie within the bandwidth of the control loop. As such, the invention is partly based on considering torque ripple as a disturbance superimposed on the ideal constant drive torque that is generated in response to a given demand by feeding back the rotor position signal. According to the invention, the control loop modulates the system response to a torque or speed demand so as to counter the inherent variation of torque with angle as the motor shaft rotates. To reduce the effect of torque ripple, the dominant spectral content of any change of torque should be well within the bandwidth of the control loop. Additionally, the rate of change of torque due to the torque ripple must be less than the slew rate limit of the control loop. Also, the control loop should not saturate within the extremes of torque demand that are likely to be imposed on it. Thus, there should be sufficient spare control capacity in the control loop above the average torque demand value to cope with the maximum torque demand. This demand is best addressed when the position of the motor rotor relative to the stator is one of minimum relative torque production, i.e. the lowest point on the uncompensated torque ripple waveform.

In addressing the first criterion referred to above, the invention adopts a radically different approach to conventional thinking in the art by deliberately using a coarse pole structure as part of the effort to reduce torque ripple, as opposed to the generally accepted practice of using a finer pole structure (a greater pole density) for a reduced torque ripple in practical implementations. The inventor has recognized that it is possible to approach the problem from the perspective of reducing the rate of change of torque with respect to rotor angle and, therefore, with respect to time for a given speed to relax the severity of the demands placed on the control regime.

The rate of change of torque with respect to rotor angle is a property of both the motor's geometry and the current waveforms used to energize the phase windings. The rate of change of torque with respect to time is additionally proportional to motor speed. The fundamental ripple frequency, at a given speed, is the product of the number of rotor poles, the number of phases and the motor speed in revolutions per second. According to embodiments of the invention, the rotor pole pitch is kept deliberately large so that the fundamental ripple frequency is reduced for a given number of phases. Thus, the control loop is provided with a better opportunity of smoothing the torque ripple by lowering the fundamental ripple frequency within the control loop bandwidth. The lower the fundamental ripple frequency in relation to the control loop bandwidth, then the easier it is to design a control frequency response that can reject the ripple.

The choice of the number of phases is a compromise between the need to keep the magnitude of the inherent torque ripple down (requiring the conventional greater number of phases) and the attendant disadvantage of the higher ripple frequency which requires an increase in the control loop bandwidth.

In one embodiment the motor has six rotor poles. It is rated at 1 kW and designed to run between zero and 2500 rev/minute. The speed of the motor has a direct effect on torque ripple frequency. As the motor speed increases, the capacity of the control loop to attenuate ripple magnitude tails off. Thus, there comes a point in the increasing motor speed at which the torque ripple frequency is too high for the control loop to compensate adequately. However, at high speed the mechanical inertia of the rotor and load can be sufficient to swamp the effect of the relatively high frequency torque ripple. The control loop bandwidth should be sufficient to attenuate torque ripple up to a motor speed at which the swamping is sufficiently significant to alleviate the need for control loop torque ripple rejection.

Figure 2A:
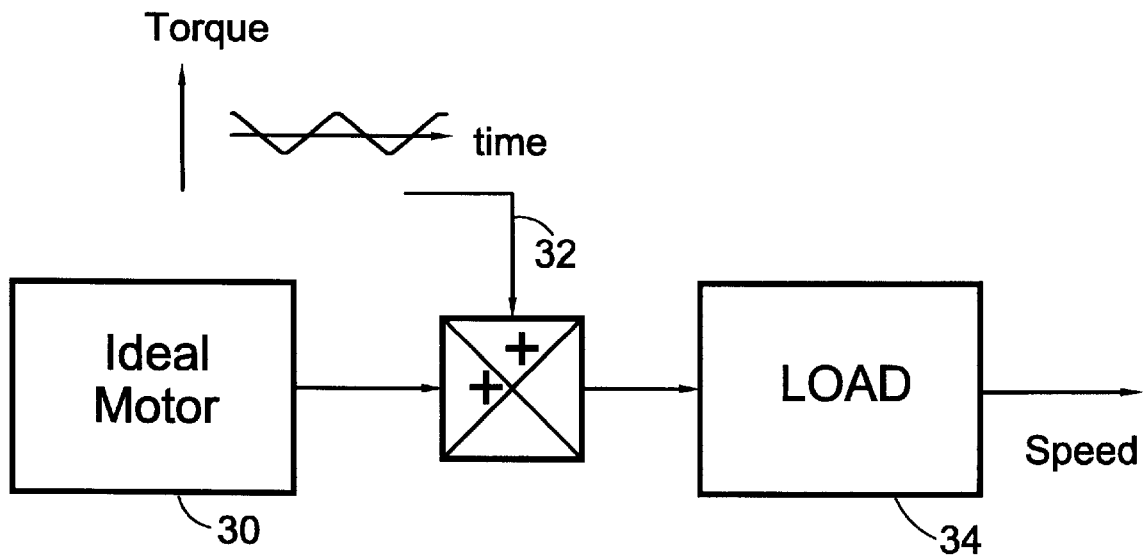
FIG. 2A is a system block diagram of a model representing SR motor response characteristic.
Figure 2B:
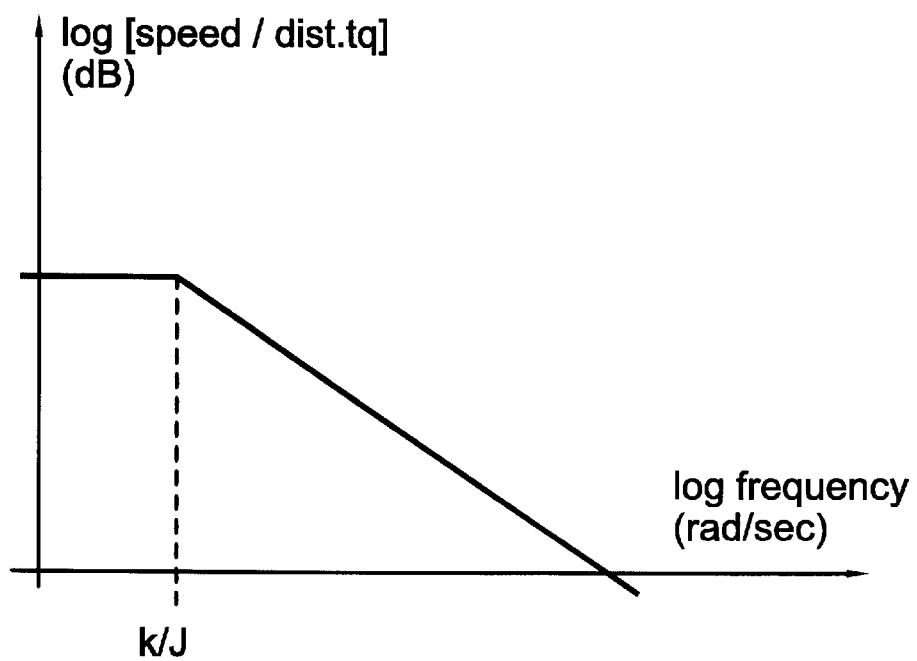
FIG. 2B is a piecewise-linear Bode diagram showing the inherent frequency response of a typical, simple, mechanical load comprising inertia plus viscous friction.

FIG. 2A shows the control system diagram for the case of an 'ideal' motor 30 in which the ripple torque is added as a disturbance torque 32 to the output of the ideal motor. The output of the motor is subjected to a mechanical load 34 comprising an inertia J (units=kgm$^2$) and viscous friction k (units=Nmsec rad$^{-1}$). The inertia reduces the effect of the disturbance torque as the speed of the motor, and, therefore, the disturbance frequency, increases beyond the pole or corner frequency determined by $\omega$=k/J. In FIG. 2B the piece-wise linear approximation to the frequency response of the torque ripple rejection of the uncompensated system as a 'real' motor speed output is illustrated, in which the increasing effect of mechanical inertia with increasing disturbance frequency and motor speed is evident.

Figure 3:
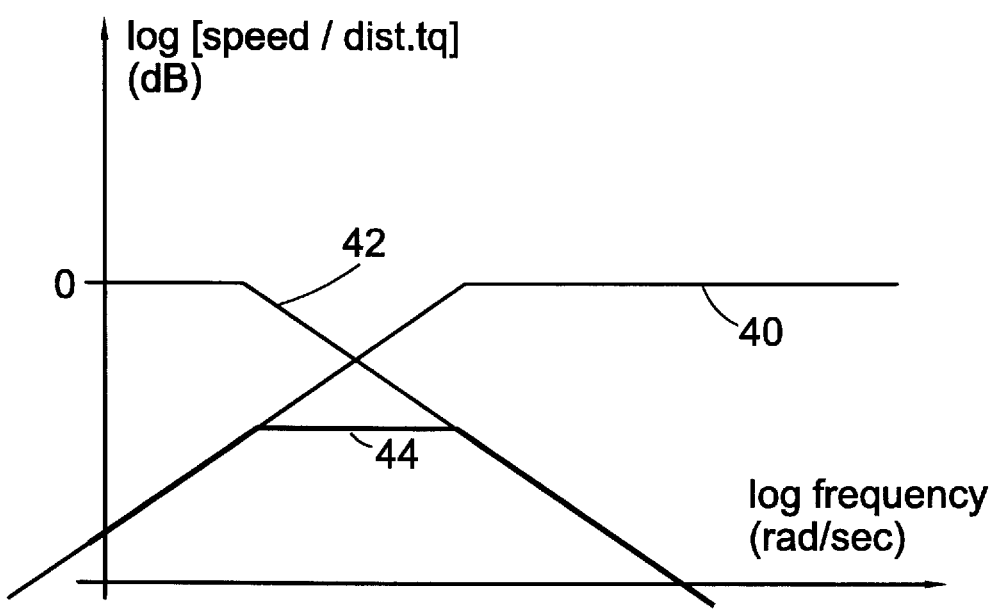
FIG. 3 is a piece-wise linear Bode plot of torque ripple rejection according to the invention.

FIG. 3 illustrates a piece-wise linear approximation 40 to the idealized Bode plot for the control loop and the overall system response for this embodiment of the invention designed to provide high rejection at low disturbance frequencies and hence at low motor speeds to compensate for the torque ripple, and a tail off in response as the mechanical inertia becomes more significant at higher speeds. It will be seen that the response of the control loop is superimposed in FIG. 3 on the response 42 of the motor shown in FIG. 2B. The overall response 44 is the product of the control loop and motor response 40 and the load response 42.

It will be appreciated by those conversant with feedback controller design that the overall response of FIG. 3 is only one of many possible shapes. By tailoring the response of the speed/position controller, and/or the load characteristics, other responses can be achieved. In general, the response at low frequencies (i.e. low speeds) will be governed by the characteristics of the speed/position controller, while the response at high frequencies (high speeds) will be dominated by that of the mechanical load. The wider the bandwidth of the position/speed controller, the higher the frequency (speed) at which it will operate, and hence the better the overall rejection of torque ripple will be.

Figure 4:
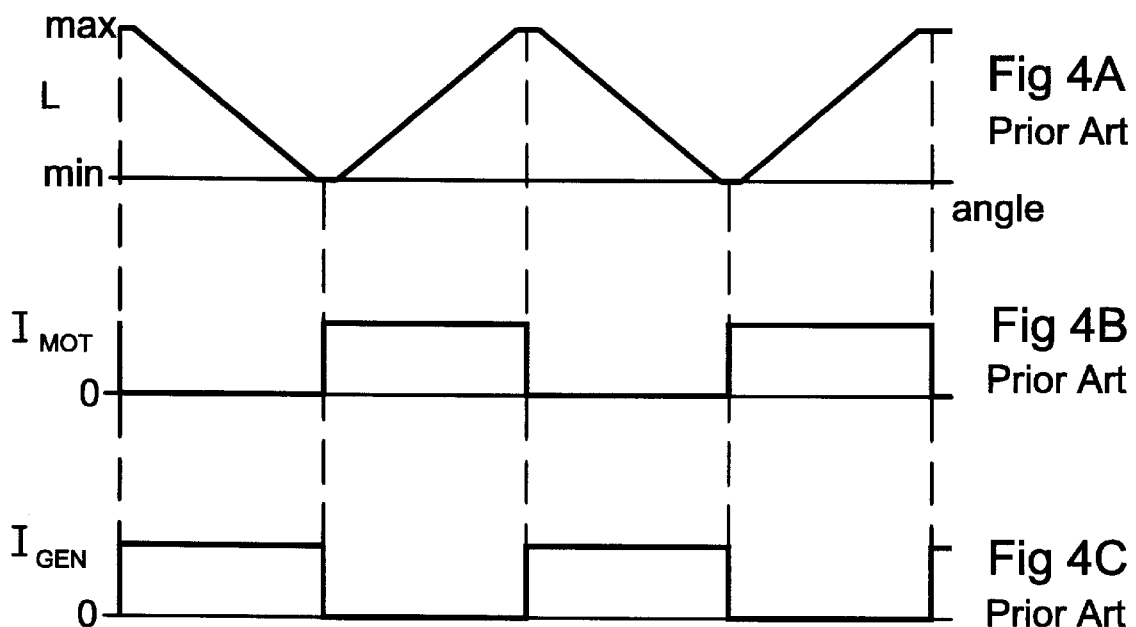
FIGS. 4A, 4B and 4C illustrate inductance and current waveforms for a conventional switched reluctance machine.

Referring to FIGS. 4A–4C, at low speeds a conventional switched reluctance motor controller will typically provide current in a controlled square wave excitation to each phase winding. The switch-on and switch-off of current to the motor shown in FIG. 4B typically coincides with the minima and maxima of inductance of FIG. 4A. When operating in the motoring mode, the controller supplies a substantially constant winding current over the region of increasing inductance as a rotor pole moves toward one of the maximum inductance position with respect to one of the stator poles.

At low current levels, this form of control does not result in rapid changes in the motor's torque output, the torque ripple being solely a function of the machine's inductance profile at the current level in question. Each phase is energized and de-energized at commutation points in the rotor cycle at which that phase's torque would be zero in any event. However, in practice, although the torque contribution at the commutation point is zero, there is torque disturbance associated with the other phases. As it is the magnetomotive force that is switched, the torque productivity of the other phases is disturbed due to a proportion of the magnetic path in the rotor and the stator being shared between phases. This is an increasing problem as the torque output rises and the iron of the rotor and the stator begins to saturate. This results in rapid, step-like torque disturbances (ripple) occurring at the commutation instants, regardless of the accuracy of commutation at the zero torque positions for any one phase. Because of their large high-frequency content, the overall speed/position controller is unable to effectively reject these disturbances, and unacceptable speed and/or position errors may result.

FIG. 4C illustrates the generating case in which the current rises and falls with maxima and minima of inductance, respectively.

The controller of this embodiment of the invention modifies the waveform of the motor phase current by profiling the rising and falling edges so as to alleviate the disturbing effect of a step change in torque. This results in a modification of the torque profile to effect a lower rate of change of torque with respect to time, but not necessarily a low magnitude of inherent torque ripple. By this technique of addressing the instantaneous phase current and controlling it so that the rate of change of current is controlled, the reduced torque ripple is more easily rejected by the feedback control function of the machine.

In effect, this embodiment of the invention may be considered as a combination of a feed forward technique for current profiling, to reduce the rate of change of torque with time, with a feedback technique, using a rotor position parameter (e.g. speed) to reduce the overall magnitude of the torque ripple.

Figure 5:
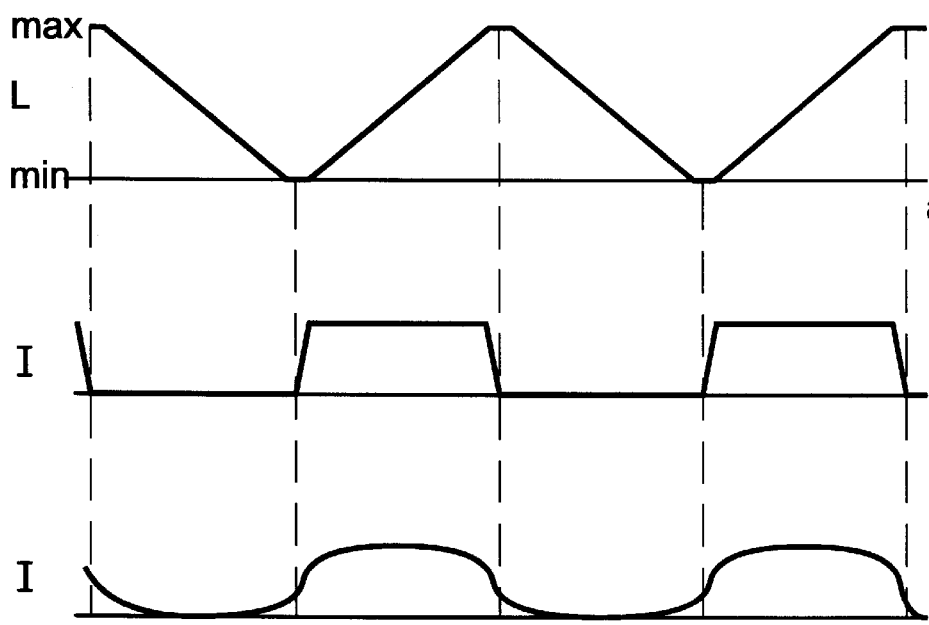
FIGS. 5A, 5B and 5C illustrate inductance and current waveforms for a switched reluctance machine controlled according to the invention.

In this embodiment, the bandwidth of the control loop frequency response shown in FIG. 3 is of the order of 120 Hz. The low-speed current profiling in the chop control mode takes the form shown in FIG. 5B. FIG. 5A is simply a repetition of the machine inductance cycle of FIG. 4A.

The effect of the slopes of the rising and falling currents on the average low speed and stall torque output of the motor is small (a few percent reduction) as the slope is arranged to occur in the zero or low torque producing part of the inductance period for each phase. At high speeds, the current shape will be more significantly dictated by other considerations, such as available supply voltage, motor winding design and system efficiency. To permit the invention to be disabled without any discontinuity in the system torque-speed characteristics, the slope with respect to rotor angle is increased with increasing motor speed, so that the motor current waveform gradually reverts to that associated with a conventional controller as medium and high-speed regions are entered. Typically for the implementation discussed, the invention operates for speeds below 300 rev/min, although different implementations may have lower or higher upper limits. Also, the control loop bandwidth of 120 Hz is capable of torque ripple attenuation in the low-speed region only. The slope of the rising current in FIG. 5B is chosen to fall close to the interval of minimum inductance ($L_{min}$). Different slopes can be used for the rising and falling currents, respectively at turn-on and turn-off of phase energization. The greater angular extent of the minimum inductance region ($L_{min}$) compared with the maximum inductance region ($L_{max}$) is available for a generally shallower slope for the rising current than the falling current for a given motor speed and acceptable loss of torque for a given peak phase current.

FIG. 5C illustrates a current profile having generally cosinusoidal rising and falling regions that could be used in order to alleviate the abrupt transitions between slopes which are present at maximum and minimum currents in FIG. 5B. This will give further improvement in the ability of the control loop to reject disturbances associated with those instants. It will be appreciated that the generating case uses similar waveforms shifted by 180°.

It will be appreciated that the purpose of the linear profile and the cosinusoidal profile current shaping are intended to achieve a smooth transition between zero current and maximum current in the winding. Other suitable functions are B-splines, exponentials, etc.

The current profiling is implemented as a pre-programmed function of the controller. The controller output is a current reference, supplied to the power electronics 10 (see FIG. 1). At zero speed and at low speeds, where there is sufficient computing time available in the microcontroller, and where there is sufficient forcing voltage to ensure the actual winding current accurately follows the reference value, the essentially square current references of FIGS. 4B and 4C are modulated by the microcontroller when the motor rotor angle is close to the region of minimum or maximum inductance for the phase in question. The square current reference of FIG. 4B/4C is multiplied by a function of angle whose value changes from zero to unity linearly (or cosinusoidally) with angle over the region of profiling, and is unity elsewhere. By adjusting the slope of the modulating function with respect to angle, the degree of current shaping may conveniently be adjusted. At medium speeds, the time interval corresponding to a reasonable, practicable degree of current shaping becomes short, and it eventually becomes desirable, as the speed further rises, to disable the profiling. This is because: (a) the microprocessor may not be capable of operating at a sufficiently high sample rate to calculate sufficient samples for a smooth profile; and/or (b) the limited voltage available to force current change in the inductive motor windings becomes the limiting factor.

It will be appreciated by one of ordinary skill in the art that item (a) above can be addressed by use of a more rapid signal processing technique, e.g. by modulating the current reference in the analog domain, or by use of high-speed digital techniques. Item (b) can be addressed through increased supply voltage and/or modified motor winding design.

Figure 6:
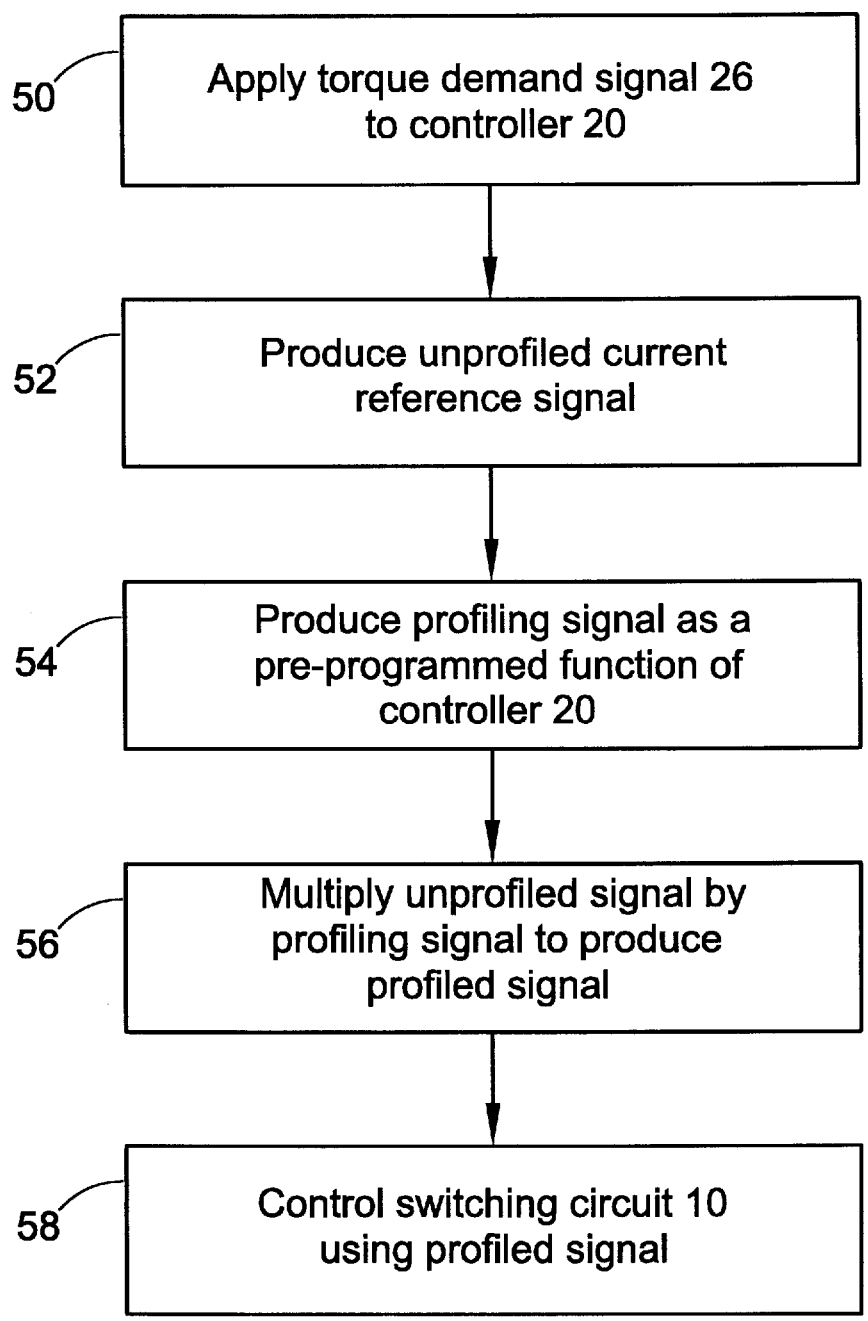
FIG. 6 is a flow chart showing operational steps according to an embodiment of the invention.

FIG. 6 is a flow chart showing process steps according to the invention. In step 50, torque demand signal 26 is applied to controller 20. Controller 20 produces an unprofiled current reference signal at step 52, and a profiling signal as a pre-programmed function of controller 20, at step 54. The unprofiled current reference signal and the profiling signal are multiplied at step 56, and the resulting profiled signal is used to control switching circuit 10, at step 58.

Prior to this invention, discussions have been concerned only with modulating the motor phase current with respect to the motor shaft angle. However, it will now be appreciated that the inventor has recognized that it is possible to profile the current at a given motor speed, with respect to time, the time available being a function of motor speed and the required degree of current shaping. This may be preferable in situations where a high-resolution measurement of rotor angle is not available, for example when a relatively simple coarse encoder is used for reasons of cost.

In the foregoing specification, the invention has been described with reference to specific exemplary embodiments. It will, however, be evident that various modifications and changes may be made thereto without departing from the broader spirit and scope of the invention as set forth in the appended claims. For example, the present invention is applicable to reluctance machines having numbers of stator and rotor poles different from those illustrated above. Further, the present invention is applicable to reluctance machines having a different number of phases than those discussed above in connection with the above examples. The specification and drawings are, accordingly, to be regarded in an illustrative rather than a restrictive sense.

I claim:

1. A method of smoothing the output ripple of a switched reluctance machine comprising a rotor, a stator, and at least one phase winding, the method comprising:
   rotating the rotor relative to the stator;
   monitoring a position parameter of the rotor relative to the stator;
   actively profiling a pulse of phase winding current as a function of rotor position by shaping the leading and trailing edges of the pulse so as to reduce the rate of change of torque with respect to time in each phase inductance cycle, the profiling altering natural current growth and decay in the pulse; and
   controlling the profiled phase current with feedback based on the monitored position parameter so as to reduce the overall magnitude of the output ripple of the machine.

2. A method as claimed in claim 1 in which the profiling includes using feed forward in which the monitored position parameter is compared with a reference signal to produce an error signal, including output ripple information.

3. A method as claimed in claim 1, in which the controlling includes:
   comparing the monitored position parameter with a reference signal; and
   energizing the or each phase winding with a value of winding current based on the comparison such that the magnitude of the output ripple is reduced.

4. A method as claimed in claim 1, including:
   initiating current in the phase winding during a first period of substantially constant inductance of the phase winding; and
   withdrawing the current during a subsequent second period of substantially constant inductance of the phase winding.

5. A method as claimed in claim 1 in which rise and/or fall in current is shaped to effect a substantially smooth transition from a first value to a second value.

6. A method as claimed in claim 5 in which rise and/or fall in current is shaped according to a substantially linear slope.

7. A method as claimed in claim 5 in which rise and/or fall in current is shaped according to a cosinusoidal function.

8. A method as claimed in claim 1 in which the machine is motoring and the output is torque, at least part of the current rise, after the current is initiated, occurring within a period of minimum inductance.

9. A method as claimed in claim 1 in which the machine is motoring and the output is torque, at least part of the current fall occurring within a period of maximum inductance.

10. A method as claimed in claim 1 in which the machine is generating and the output is electrical power, at least part of the current rise, after the current is initiated, occurring within a period of maximum inductance.

11. A method as claimed in claim 1 in which the machine is generating and the output is electrical power, at least part of the current fall occurring within a period of maximum inductance.

12. A method as claimed in claim 1 in which rise and fall of current is shaped for machine speeds in a predetermined speed range.

13. A method as claimed in claim 12 in which the speed range extends from standstill of the rotor.

14. A method as claimed in claim 12 in which rise and fall of current is shaped when the machine is controlled by current chopping.

15. A method as claimed in claim 1 in which the switched reluctance machine is controlled as a servo-motor.

16. A control system for smoothing the output ripple of a switched reluctance machine comprising a rotor, a stator and at least one phase winding, the system comprising:
   means for monitoring a position parameter of the rotor relative to the stator to produce a monitored output;
   means for actively profiling a pulse of phase winding current as a function of rotor position by shaping the leading and trailing edges of the pulse so as to reduce the rate of change of torque with respect to time in each phase inductance cycle, the profiling altering natural current growth and decay in the pulse; and
   means for controlling the profiled phase current with feedback based on the monitored output so as to reduce the overall magnitude of the output ripple of the machine.

17. A system as claimed in claim 16 in which the means for profiling includes feed forward means in which the monitored output is compared with a reference signal to produce an error signal, including output ripple information.

18. A system as claimed in claim 16 in which the means for controlling include means for comparing the monitored output with a reference signal and means for energizing the or each phase winding with a value of current based on the comparison such that the magnitude of the output ripple is reduced.

19. A system as claimed in claim 16 in which the means for controlling is operable to initiate current in the phase winding during a first period of substantially constant inductance of the phase winding, and to withdraw the current during a subsequent second period of substantially constant inductance of the phase winding.

20. A system as claimed in claim 16 in which the means for controlling is operable to shape the current to effect a substantially smooth transition of the current.

21. A system as claimed in claim 20 in which the means for controlling is operable to shape the current according to a substantially linear slope.

22. A system as claimed in claim 20 in which the means for controlling is operable to shape the current according to a sinusoidal function.

23. A system for smoothing the output ripple of a switched reluctance machine comprising a rotor, a stator, and at least one phase winding, the system comprising:
   a monitoring device for monitoring a position parameter of the rotor relative to the stator;
   a profiler for actively profiling a pulse of phase winding current as a function of rotor position by shaping the leading and trailing edges of the pulse so as to reduce the rate of change of torque with respect to time in each phase inductance cycle, the profiling altering natural current growth and decay in the pulse; and
   a controller for controlling the profiled phase current with feedback based on the monitored position parameter so as to reduce the overall magnitude of the output ripple of the machine.

24. The system of claim 23, in which the profiler uses feed forward wherein the monitored position parameter is compared with a reference signal to produce an error signal, including output ripple information.

25. The system of claim 23, wherein current is initiated in the phase winding during a first period of substantially constant inductance of the phase winding, further wherein current is withdrawn during a subsequent second period of substantially constant inductance of the phase winding.

26. The system of claim 23, wherein rise and fall of current is shaped when the machine is controlled by current chopping.

* * * * *